INVENTORS
HUSSEIN NATANAGARA
PHILIP GOTTHOFFER
BY
Nolte & Nolte
ATTORNEYS

United States Patent Office 3,346,754
Patented Oct. 10, 1967

3,346,754
MOUNTING ASSEMBLY FOR RADIATION DETECTOR TUBES OF VARIOUS SIZES AND SENSITIVITIES TO RADIATION
Hussein Natanagara, Bronx, and Philip Gotthoffer, Brooklyn, N.Y., assignors, by mesne assignments, to Trilobe Coupling Corp., Brooklyn, N.Y., a corporation of New York
Filed Mar. 26, 1964, Ser. No. 354,933
14 Claims. (Cl. 313—93)

This invention relates to the construction of radiation detectors and more particularly to improved structures for mounting radiation detectors of different sizes.

A radiation detector, commonly called a Geiger tube, is a device for measuring in terms of a count the intensity of a radiation field of alpha, beta and/or gamma particles which is produced by natural or artificial radioactive means. The Geiger tube is normally formed by a sealed shell made at least partially of conducting material, called the cathode, within which is positioned a conducting electrode, called the anode. The cathode shell is filled with a quantity of a gas, or a mixture of gases, at a certain pressure to provide the counting mechanism and the anode and cathode are electrically insulated so that an electrical potential can be applied therebetween.

Counting by the tube takes place when the incident particle ionizes the gas within the cathode shell to produce ion pairs. The electrons from the ion pairs are collected by the positively charged anode and since the electrons are collected quite rapidly instantaneous pulses are produced at the anode. These pulses are either counted directly, averaged, or modified in some other desired manner by suitable circuitry external to the tube. Ideally, one pulse should be produced for each ion pair formed in the gas but, in practice, this unity factor is never achieved. This is due to the physical nature of the tube gas and the time lapse period after the initiation and during the production of the pulse, in which period no other pulse can be initiated. This time lapse is called the dead time $t$. Other physical mechanisms of a statistical nature also prevent the achievement of the unity factor different degrees for beta and gamma particles.

The radiation field intensity which the tube is to measure may be defined as the number of nuclear particles or rays traversing a unit volume in unit time. As should be evident, the field intensity being measured can be decreased by interposing a shielding material between the radiation source and the tube. The cathode shell of the detector is such a shield and hence the intensity of the nuclear particle interacting with the gas in the tube will be less than the intensity at the outer wall of the cathode. Also, the incident radiation must have a certain minimum energy for a given thickness of cathode material of a predetermined atomic number if the energy is to penetrate the cathode shell material at all.

From the above it can be generalized that for a given radiation field only a certain number of counting pulses will be produced by the detector tube. This number will be dependent upon the attenuation of the incident radiation by the shielding of the cathode shell material, the type of radiation, the dead time $t$ of the detector, and other physical mechanisms of a statistical nature. Since the production of the radiation field and the process of counting by the tube are statistical in nature, the number of pulses produced by the detector in uniform time periods in response to a given field also falls within statistical limits. This affords a way to measure the intensity of the field, at least on a statistical basis, and this statistical measuring process is performed by the tube.

The average number of counts produced by the tube and recorded by the associated circuits in given unit time periods is called the sensitivity of the detector to the field. This sensitivity is stated in pulses per unit time. In general, if the material and thickness of the cathode shell is uniform at all places, then the total number of counts produced by the detector per unit time can be considered to be the sum of the counts per number of radioactive particles impinging on unit cross-sectional area of the inside of the cathode shell multiplied by the total area receiving radiation from the field. The volume of the detector available for producing counts, called the active or sensitive volume, is that inner portion of the shell which is bounded by the active length of the anode exposed to the cathode and across which an electric field is established. Therefore, the unit cross-sectional area referred to is the cross-sectional area of the sensitive volume.

For an incident radiation field of given intensity and average particle energy the overall sensitivity of the detector tube is generally considered to be dependent upon the tube's cathode material and thickness and its sensitive volume. Therefore, as the intensity of a radiation field increases or decreases, with the average energy of the particles remaining constant, the counting rate of the detector, given in number of counts per given time interval, will increase or decrease in a corresponding manner. The theoretical maximum number of counts capable of being produced by the detector is the reciprocal of the dead time $t$ since each count causes a dead time interval. This dead time is variable, largely depending upon the type of gases used and other factors. Many detectors are designed to have maximum theoretical counting rates of 10,000 counts per second, where the sole limiting factor is considered to be the dead time. However, because of other factors the maximum theoretical counting rate as determined by the dead time may never be obtained.

As described above, each detector has a maximum counting rate which cannot be exceeded regardless of the intensity of the impinging particles. Therefore, a detector designed to operate at one maximum counting rate will not be effective when exposed to a radiation field whose intensity would produce counts in excess of the maximum. Such a detector is said to be saturated after the maximum count is reached. It should also be clear that a saturated detector would be ineffective in distinguishing between different radiation fields whose intensities would produce a counting rate above the detector's own designed maximum counting rate. Thus, the sensitivity of a detector tube determines the maximum field intensity that can be accurately measured and this maximum cannot be exceeded if the tube is to make a specific quantitive measurement of the field.

In order for a given detector tube to be able to measure field intensities greater than that at which its counting rate is a maximum, its sensitivity must be reduced so that it will not saturate. The reduction may be accomplished by decreasing the detector's sensitive volume and/or, to some extent, by varying the constitution of the gas mixture. While the interposition of a shield and/or the increase in cathode wall thickness will also decrease sensitivity it should be noted that this raises the minimum energy needed by a particle for penetration to the sensitive volume of the detector. This might be undesirable in some cases where measurements are to be made of particles of the same average energy in the same or different fields.

A reduction in the detector tube's sensitive volume, and thus a reduction in its sensitivity, can be readily accomplished by decreasing the active anode length without changing the inner diameter of the cathode shell. This may be done by decreasing the length of the tube cathode shell or shielding a portion of the cathode with some insulation material to eliminate the electric field across that portion. There are practical limits to the reduction of the active anode length to inner tube shell diameter ratio. As this ratio is decreased, for example, to 4:1, which may be taken as a reasonable figure of merit for a typical tube, the operating plateau of the detector becomes markedly steeper. The plateau of a tube is that range of operating potential over which the counting rate response (sensitivity) of the tube to a given field is uniform within a specified maximum percentage of the counting rate at its normal operating potential point. Steepening of the plateau, i.e., increasing the maximum count variation percentage, results in a greater possibility of field measurement error should the operating potential drift above or below the normal operating value for any reason. Reducing detector sensitivity by decreasing the tube diameter is also limited by the minimum practical ratio of active anode length to diameter. A reasonable figure of merit for this ratio for a typical tube would be 6:1. It should be understood that no absolute values exist for these ratios and they may vary with individual tube design.

It should be clear from the above that no great reduction in sensitivity can be accomplished for any given detector tube without a reduction in both the inner diameter and active anode length dimensions. Of course, these dimensions cannot be readily varied once a particular tube has been constructed. As a result, several detector tubes of different sensitivities are normally used to measure a broad range of field intensities. It is possible, by suitable choice of dimensions of these several tubes to establish a sensitivity ratio between detectors by a specified factor, such as 10/1, 25/1, etc. By switching between several tubes connected to the same counter, different field intensities can be measured with considerable accuracy. Thus, one counter can be used in a variety of applications.

A number of detector tubes having different sensitivities to a given field intensity and different maximum intensity capabilities, would comprise a variety of shapes and sizes. Where a number of these tubes are to be used in the same counter, each different size would require separate mounting accessories, calibration fixtures, etc. Also, it is highly likely that differences would exist between tubes in their respective abilities to withstand environmental extremes and mechanical duress, such as a shock, vibration, torsion. Therefore, a separate mechanical protective device would have to be devised for each. Since each protective device must be tailored to the individual tube, mechanical protection is usually provided at the expense of some desired operating feature of the individual or others of the tubes.

The present invention is directed to a mounting structure for providing the necessary environmental and mechanical protection for a number of detector tubes of different sensitivities, shapes and sizes while at the same time making these tubes readily usable in a single instrument without providing special mountings. In accordance with the invention a standard tube size is selected, this size being the largest necessary, and detector tubes of smaller dimensions are mounted within a mounting shell having the same dimensions as the standard size tube. Each shell is also preferably provided with the same type of internal and external mounting means so that the mounting problem for a variety of tubes is considerably simplified. The structure for the mounting shell is made to be structurally strong so that the resistance to mechanical shocks and environmental changes of all of the different size tubes mounted therein is considerably enhanced.

In one embodiment of the invention, where the tube to be placed within the mounting shell is somewhat smaller than the shell, a portion of the mounting shell is sealed off to form a reservoir for an added supply of the counter gas mixture. The reservoir is in communication with the gas in the tube to replenish the tube's gas supply in the event that some of it leaks off for one reason or another. This arrangement greatly increases the life of the tube.

It is therefore an object of this invention to provide improved mounting structures for different size radiation detector tubes.

A further object of the invention is to provide mounting structures for different size radiation detector tubes in which a standard size mounting shell is selected and smaller size tubes are held within the shell.

A further object of the invention is to provide a mounting shell for different size radiation detector tubes in which portions of the shell are left open and are supported by rib structures.

Yet another object of the invention is to provide a mounting structure for a radiation tube in which a portion of the structure is sealed off and used as a gas reservoir for the tube.

Other objects and advantages of the present invention will become more apparent upon reference to the following specification and annexed drawings in which.

Figure 1:
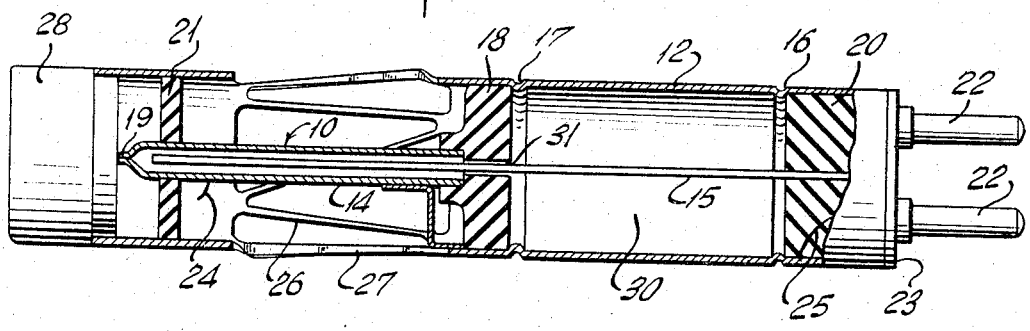
FIGURE 1 shows partly in elevational view and partly in section the mounting structure having a detector tube therein.
Figure 2:
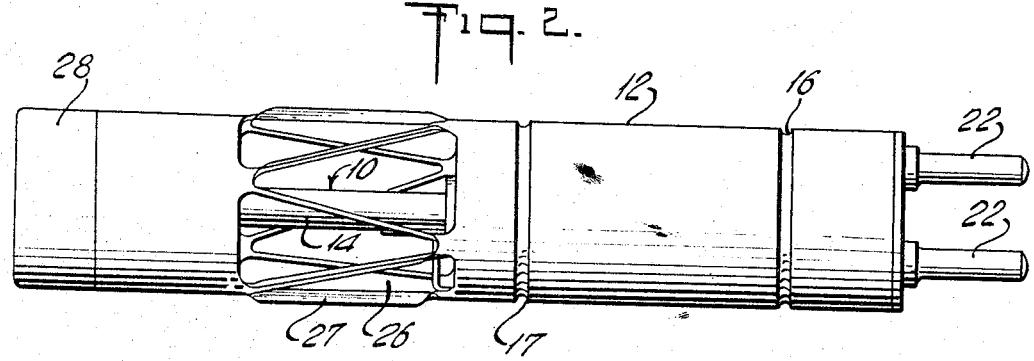
FIGURE 2 is an elevational plan view of the detector of FIGURE 1.

Referring to FIGURES 1 and 2, the radiation detector tube 10, commonly called a Geiger tube, is shown mounted within an outer mounting shell 12 which is preferably of a conductive material such as stainless steel. The tube 10 is of generally conventional construction and is formed by an outer cathode 14 of a suitable conductive material within which is mounted a rigid rod of conductive material 15 for the anode. The length of the tube 10 is illustratively less than that of the shell 12 and one end of the cathode 14 is mounted within the raised shoulder of an insulator 18 located at an intermediate point of the shell. The insulator 18 effectively seals off this end of the tube except for a slightly oversize and open passage 31 through which the anode 15 passes. A crimp 17 is formed in the shell below the insulator 18 to hold the insulator and to seal off the lower portion of the shell from that portion above the insulator. The other end of the cathode is tipped off at 19 by any conventional process and is held by a disc 21 of insulating material which fits tightly within or is fastened to the inner wall of shell 12. The end of the anode outside of the tube passes through an insulating base member 20 which forms a seal therearound. A second crimp 16 is formed in the shell above the base 20 to hold it in the shell and to seal off the inner portion of the shell above the base. Thus, a sealed volume 30 is formed in the shell between the lower surface of insulator 18 and the upper surface of base insulator 20.

The base insulator 20 terminates in several electrical contacts 22 fastened to an insulated plate 23 at the bottom of the shell. A direct connection is made between the anode and one of the contacts 22 while the cathode is connected to the shell 12 near the upper end thereof by a wire 24 which is spot welded or otherwise electrically connected therebetween. Another wire 25 adjacent base 20 connects the shell 12 to another of the contacts 22. An electrical potential is applied across the anode and cathode by connecting a suitable source (not shown) to the respective contacts 22. This produces the electric field across the two electrodes.

The end of the shell adjacent the tipped off portion of the tube is covered by a cap 28 whose shoulder fits within the shell. This cap is preferably of a suitable insulating material, such as a phenolic plastic, and it is fastened to the shell by any suitable means, for example by an epoxy resin glue. It can be seen that the tube 10 is rigidly mounted within the shell by the insulator 18, the disc 21 and the base insulator 20 which are all made of a suitable insulating material, such as ceramic.

As can be seen the Geiger tube 10 itself is of generally conventional construction. It is filled with any suitable gas to serve as the counting mechanism and the tube operates in the conventional manner.

In order for the tube 10 to operate, the particles from the incident radiation field must be allowed to impinge upon the cathode. This is accomplished by making a number of openings 26 in the periphery of the shell opposite the active area of the cathode. A plurality of ribs 27 are provided as supports for the shell in the area of the openings 26. The ribs are made as thin as possible to afford maximum exposure of the cathode to the radiation field and as few ribs as possible are used to avoid any appreciable shielding. If desired, the dimensions of the counter can be changed to make the tube slightly more sensitive thereby compensating for the shielding produced by the ribs.

The ribs 27 must have sufficient structural strength to maintain the overall strength of the shell within reasonable limits from the state of the uncut shell. In the case where large inner counter tubes are used a relatively large number of wide ribs may be employed without difficulty since, these large tubes have a large sensitive volume and hence less affected by the shielding produced by the ribs. Where smaller counter tubes are utilized, fewer and narrower ribs 27 are usually required.

The ribs 26 are also preferably twisted by 90° to permit better exposure of the cathode to the incident radiation field. By twisting the ribs 90° they present their narrow edge to the incident radiation field and to the tube thereby minimizing the shielding effect. Twisting of the ribs also offers greater resistance to crushing of the shell.

It is also important that the same extent of area of the internal counter tube be shielded for any change in angle of the rotation of the shell assembly. Therefore, the openings 26 and the ribs 27 are made uniform over the entire periphery of the shell. In most cases a small percentage reduction in the counting rate from shell rotational point of minimum shielding by the ribs to that of maximum shielding, say in the order of 5%, can be tolerated. Therefore, the structure need not be exactly uniform.

In the tube of FIGURES 1 and 2 the cathode 14 also acts as a support for the rib structure forming the openings. Thus a fairly rigid assembly is provided which is formed by a minimum number of components, including the tube 10.

The sealed inner volume 30 of the shell between the insulator 18 and base 20 is in communication with the interior of the tube 10 through the passage 31. This sealed volume provides a reservoir which may be filled with gas for the tube so that the gas within the tube may be replenished in the event it becomes depleted. A suitable access (not shown) is provided to the reservoir 30 so it can be filled with the gas. This access is sealed after the gas is filled in both the tube and reservoir. If the gas reservoir is not needed then the passage 31 in the insulator 18 would be sealed off and would hold the anode firmly therein.

The shell 12 of FIGURES 1 and 2 is selected to be of a standard size, this being the maximum size tube that normally would be used with the equipment in which a tube is to be utilized. It should be clear that by changing the sizes of the insulator mountings 18, 20 and 21 shown in FIGURE 1 that tubes having different cathode inner diameter to active anode length ratios can be held within the shell. Also, the sensitivity of the tube can be reduced by reducing the size of the shell openings 26.

Figure 3:
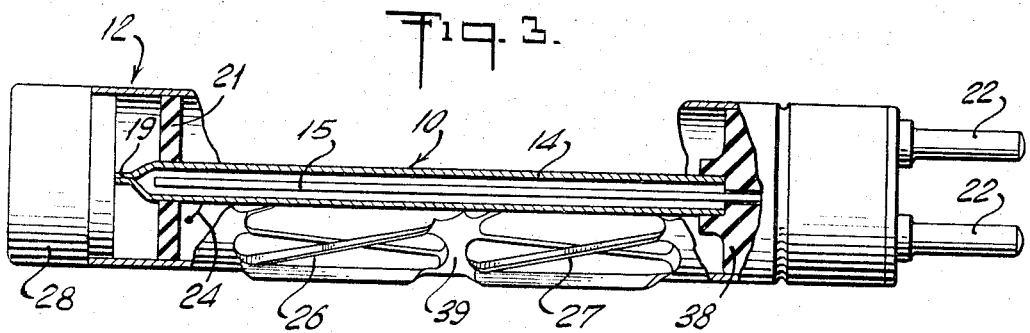
FIGURE 3 is a plan view taken partially in section of another embodiment of the invention.

FIGURE 3 shows an arrangement for mounting a larger tube having greater sensitivity within the standard mounting shell 12. Here the insulator 18 is not used at an intermediate point within the shell. Instead, a similar insulator 38 is provided at the base for sealing the end of the cathode and for passing the anode through to one of the contacts 22. In this case the anode lead is sealed within the insulator 38 so that the tube is closed. The other end of the cathode is again held by the insulating disc 21 to firmly support the tube within the shell.

Since the tube 10 of FIGURE 3 is relatively long, two sections of openings 26 are cut in the periphery of the shell. This exposes a substantial portion of the surface of the cathode to the incident radiation field. As before, the ribs 27 are twisted to increase the strength of the shell and to reduce the shielding effect on the incident radiation. If desired, another insulating disc 21 can be placed within the shell to hold the tube in the space 39 between the two cut-out sections. It should be noted that no gas reservoir is provided in this embodiment.

The embodiments of the invention shown in FIGURES 1 and 2 and in FIGURE 3 are only illustrative of the different sizes of Geiger tubes which may be mounted within the standard mounting shell 12. It should be understood that any size tube and shell can be used of greater or lesser relative lengths and/or diameters than those shown. Also, no specific shape is needed for the shell 12. While it is generally easier to make the shell cylindrical, any other shape may be used, for example, square, triangular, polygonal, etc. However, it should be clear that any single mounting shell, no matter what its outer shape, can house a wide variety of tube sizes having different sensitivities.

From the foregoing description it can be seen that a number of different sizes of tubes of different sensitivities can be accommodated within a single shell size. Since the outer shell's dimensions and construction can be standardized, only a single type of mounting means, calibration fixture, shock prevention assembly, etc., need be provided for the various tubes. This considerably simplifies the problems of mounting and using a number of tubes of different sensitivities at the same installation.

While preferred embodiments of the invention have been described above, it will be understood that these are illustrative only, and the invention is limited solely by the appended claims.

What is claimed is:

1. A mounting structure for radiation detector tubes of different sizes, comprising: an external elongated mounting shell, two spaced insulator means mounted within said shell for holding a detector tube to be mounted within the shell, and a plurality of circumferentially spaced ribs forming an opening in the wall of the mounting shell between said insulator means and extending substantially in longitudinal direction of said shell at acute angles with regard to lines parallel to the longitudinal axis of said shell to permit an incident radiation field to impinge upon a detector tube mounted within said shell without concealing entire radial sectors of the tube.

2. A mounting assembly as set forth in claim 1 wherein said ribs are twisted to present a surface of smaller area to an incident radiation field.

3. A mounting assembly according to claim 1, in which said elongated mounting shell and one of said insulator means confine a sealed chamber for storing gas and located remote from said opening, and in which said last-mentioned insulator means confines a passage considerably narrower than said detector tube to permit passage of gas from said chamber to the tube.

4. A mounting assembly for radiation detector tubes comprising an external mounting shell, a Geiger tube within said shell having an anode and a cathode across which an electric field is to be established, two spaced insulator means mounted within said shell for holding at least said tube cathode, and a plurality of circumferentially spaced ribs forming an opening in the wall of the mounting shell between said insulator means and extending substantially in longitudinal direction of said shell at acute angles with regard to lines parallel to the longitudinal axis of said shell to permit an incident radiation field to impinge upon said cathode without concealing entire radial sectors of said cathode.

5. A mounting assembly as set forth in claim 4 wherein one of said insulator means holds said cathode and has a hole therein through which the said anode passes, said hole being large enough to form a gas passage but considerably narrower than said cathode.

6. A mounting assembly as set forth in claim 4 wherein one of said insulator means holds said cathode and anode and seals one end of the tube.

7. A mounting structure for a radiation detector tube comprising an external mounting shell, a first member at one end of said mounting shell for sealing the same, a plurality of electrical contact members adjacent said first member, an insulator member located within the mounting shell, the mounting shell being sealed at said first member to provide a gas reservoir in the internal shell space between said first and insulator members, a detector tube having an outer cathode held by said insulator member in the shell space between the insulator member and the end of the shell opposite said first member and also having an anode within said cathode, said cathode being sealed at one end thereof and said insulator member being provided with a passage considerably narrower than the detector tube cathode for communication between the reservoir and the interior of the detector tube cathode, means for electrically connecting said anode and said cathode to respective ones of said electrical contact members, and a plurality of circumferentially spaced ribs forming an opening in the wall of the mounting shell opposite the detector tube cathode and extending substantially in longitudinal direction of said shell at acute angles with respect to lines parallel to the longitudinal axis of said shell to permit an incident radiation field to impinge on said cathode.

8. A mounting assembly for radiation detector tubes of various sizes and sensitivities to radiation, comprising: an elongated shell of a predetermined standard size having a first end section, a second end section and an intermediate section, first insulator means mounted in said first end section and provided with means for supporting one end of a radiation detector tube, second insulator means mounted in said second end section and provided with means for supporting the other end of a radiation detector tube, said second insulator means being selectively movable in said second end section of said standard size shell to a position determined by the length of the tube to be supported, means for holding said second insulator means in the respective adjusted position, and a plurality of ribs forming an opening in the wall of said intermediate section of said mounting shell to permit an incident radiation field to impinge upon a detector tube in said shell.

9. A mounting structure as set forth in claim 8 wherein said ribs are twisted to present a surface of smaller area to the incident radiation field.

10. A mounting assembly according to claim 8, which includes a plurality of electrical contact members arranged at one of said end sections to apply an electric field to a tube in said assembly.

11. A mounting assembly according to claim 10, in which said contact members form a plug adapted to be received in a socket of a counter.

12. A mounting assembly according to claim 8 in which said plurality of ribs are circumferentially spaced from each other and extend substantially in longitudinal direction of said shell at an acute angle with regard to lines parallel to the longitudinal axis of said shell.

13. A mounting assembly for radiation detector tubes of various sizes and sensitivities to radiation, comprising: an elongated shell of a predetermined standard size having a first end section, a second end section and an intermediate section, first insulator means mounted in said first end section and provided with means for supporting one end of a radiation detector tube, second insulator means mounted in said second end section and provided with means for supporting the other end of a radiation detector tube, said second insulator means being selectively movable in said second end section of said standard size shell to a position determined by the length of the tube to be supported, at least a portion of said second end portion remote from said first insulator means forming a gas reservoir, said second insulator means being provided with a passage therethrough considerably narrower than the detector tube to be supported in said second insulator means to permit passage of gas from said reservoir into the supported tube, means for holding said second insulator means in the respective adjusted position, and a plurality of ribs forming an opening in the wall of said intermediate section of said mounting shell to permit an incident radiation field to impinge upon a detector tube in said shell.

14. A mounting assembly according to claim 13 in which said plurality of ribs are circumferentially spaced from each other and extend substantially in longitudinal direction of said shell at an acute angle with regard to lines parallel to the longitudinal axis of said shell.

References Cited

UNITED STATES PATENTS

| 2,675,483 | 4/1954 | Leighton et al. | 250—83.6 |
| 2,761,071 | 8/1956 | Hurst | 250—83.1 |
| 2,974,248 | 3/1961 | Auxier et al. | 313—93 |
| 3,047,760 | 7/1962 | Hermsen et al. | 313—93 |

FOREIGN PATENTS 855,111  11/1960  Great Britain.

OTHER REFERENCES

AEC Radiation Instrument Catalog–AK–18A, Probe Assembly for Coaxial Base Geiger Tubes, July 1, 1953, 1 p.

JAMES W. LAWRENCE, *Primary Examiner.*

R. JUDD, *Assistant Examiner.*